(12) United States Patent
Chatterjee et al.

(10) Patent No.: US 8,145,641 B2
(45) Date of Patent: Mar. 27, 2012

(54) MANAGING FEATURE DATA BASED ON SPATIAL COLLECTIONS

(75) Inventors: Raja Chatterjee, Nashua, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 855 days.

(21) Appl. No.: 12/009,456

(22) Filed: Jan. 18, 2008

(65) Prior Publication Data

US 2009/0187587 A1  Jul. 23, 2009

(51) Int. Cl.
*G06F 7/00* (2006.01)
*G06F 17/30* (2006.01)
(52) U.S. Cl. ......................... 707/743; 707/769
(58) Field of Classification Search ........................ None
See application file for complete search history.

(56) References Cited

U.S. PATENT DOCUMENTS

| | | | |
|---|---|---|---|
| 6,278,994 B1 * | 8/2001 | Fuh et al. ............................. 1/1 |
| 6,708,183 B1 * | 3/2004 | Mori et al. ............................ 1/1 |
| 6,950,828 B2 * | 9/2005 | Shaw et al. .................... 707/743 |
| 7,437,249 B2 * | 10/2008 | Corson et al. ................... 702/32 |
| 7,730,211 B2 * | 6/2010 | Balassanian et al. ......... 709/246 |
| 7,836,082 B2 * | 11/2010 | Adler et al. .................... 707/791 |
| 7,984,037 B2 * | 7/2011 | Wan et al. ..................... 707/711 |
| 2002/0126701 A1 * | 9/2002 | Requena ....................... 370/469 |
| 2004/0260510 A1 * | 12/2004 | Du ................................. 702/179 |
| 2005/0055376 A1 * | 3/2005 | Xie et al. .................... 707/104.1 |
| 2005/0114083 A1 * | 5/2005 | Bullis ........................... 702/183 |
| 2005/0273461 A1 * | 12/2005 | Jameson ........................... 707/3 |
| 2006/0074977 A1 * | 4/2006 | Kothuri et al. ............. 707/104.1 |
| 2006/0212420 A1 * | 9/2006 | Murthy ............................ 707/1 |
| 2006/0218194 A1 * | 9/2006 | Yalamanchi ............... 707/104.1 |
| 2006/0242110 A1 * | 10/2006 | Goldstein ........................ 707/1 |
| 2007/0016605 A1 * | 1/2007 | Murthy et al. ................ 707/102 |
| 2007/0050340 A1 * | 3/2007 | von Kaenel et al. .............. 707/3 |
| 2008/0091757 A1 * | 4/2008 | Ingrassia et al. .............. 708/490 |
| 2008/0201302 A1 * | 8/2008 | Kimchi et al. .................... 707/3 |
| 2009/0172700 A1 * | 7/2009 | Perzy et al. .................... 719/318 |
| 2010/0011010 A1 * | 1/2010 | Murthy et al. ................ 707/100 |

* cited by examiner

*Primary Examiner* — Kuen Lu
*Assistant Examiner* — Jessica N Le
(74) *Attorney, Agent, or Firm* — Kraguljac Law Group, LLC

(57) ABSTRACT

Systems, methods, and other embodiments associated with registering a WFS feature type are described. One example method includes creating a feature instance table and a set of collection item tables to register the WFS feature type. Elements in the feature instance table and a collection item table may be related by a feature instance primary key value. The example method may also include producing an r-tree based spatial index for spatial content collection items stored in the set of collection item tables. The method may also include selectively processing a WFS request to manipulate (e.g., insert, delete, update) a WFS feature instance based, at least in part, on the feature instance table and the set of collection item tables. The method may also include selectively processing a WFS query associated with a WFS feature instance based, at least in part, on the r-tree based spatial index.

25 Claims, 10 Drawing Sheets

MANAGING FEATURE DATA BASED ON SPATIAL COLLECTIONS

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Spatial features (e.g., roads, rivers, land parcels, buildings, rooms, pieces of furniture) may be represented by geometries. Geometries may be stored in objects (e.g., SDO_GEOMETRY objects). Some spatial features are collections of other spatial features. For example, a city may be viewed as a collection of buildings, roads, open spaces, and so on. A building may in turn be viewed as a collection of rooms, hallways, doorways, and so on. A data type may describe what a feature may include. An instance of a data type may or may not include everything described in a data type. Thus, a feature instance may or may not include everything described in a feature type.

A feature instance may be an object representing one specific, actual building. The feature instance may have spatial content. The spatial content may be hierarchical (e.g., building, room(s), walls, doors). The hierarchical content may have descending degrees (e.g., complex solid, simple solid, complex surface, simple surface, line, point). Conventionally, feature data has not been indexed on spatial content.

The Web Feature Service Implementation Specification (WFS 1.0.0) proposed interfaces for describing data manipulation operations on geographic features. The proposed interfaces use HTTP to support the interfaces and data manipulation operations. A Web Feature Service (WFS) request includes a description of a query or a data transformation operation (e.g., create/update/delete) to be applied to an instance(s) of a web feature. The request may be generated on a client and posted to a Web Feature server using the distributed HTTP. The Web Feature server may parse and execute the request. An instance of a web feature may have spatial content. This spatial content may be hierarchical, meaning that a feature instance may have a collection of spatial collection content. Conventionally, this WFS feature data may not have been indexed and thus it may have been difficult, if possible at all, to search based on WFS feature data, which may have limited, or made more complicated, the processing of WFS requests.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
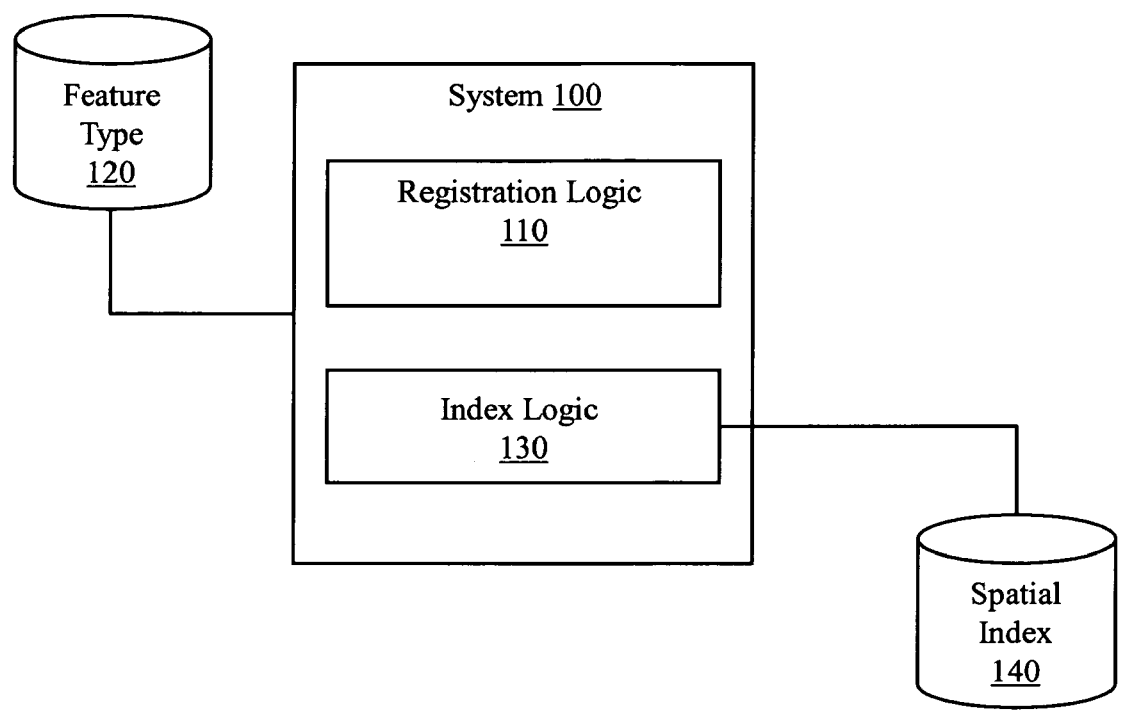
FIG. 1 illustrates an example system associated with managing WFS feature data based on spatial collections.

WFS feature data may be used to represent complex hierarchical spaces. Recall that a city may be described as a collection of buildings and spaces, among other things. The buildings and spaces may be defined by collections of points, lines, surfaces, solids, and so on. Thus, a city may be described using a collection of spatial objects. The spatial objects may be, for example, of type SDO_GEOMETRY. A space may correspond to a road, to a park, and so on. A building may itself be described as collections of spatial things. For example, a building may include collections of rooms, hallways, and so on. Members of these collections may themselves include collections of spatial things. For example, a room may include a collection of doors, a collection of windows, a collection of furniture, a collection of wiring paths and outlets, and so on.

Given this situation, example systems and methods facilitate modeling data in a way that captures the spatial information and maintains relationships between items. Example systems and methods facilitate indexing the captured data using, for example, an R-tree based spatial index. This spatial index facilitates querying the captured data. The captured data may be organized in sets of tables that facilitate managing the data by, for example, inserting new data, deleting data, and updating existing data.

In one example, systems and methods decompose (e.g., flatten) spatial feature data and store the decomposed data in containers for which a spatial index for spatial content can be created. Spatial feature data may be flattened because many, if not all, conventional systems do not include logic for storing collections. Flattening spatial feature data facilitates searching and/or manipulating the data at a sub-element level.

A feature type may be defined to describe data associated with a geographic feature. For example, a feature type may be defined to describe a solid. A solid may potentially include a number of different types of features. The complete set of features for the solid may be represented in the feature type. An actual solid may not include all the possible features in the feature type. An actual solid may also include a number of feature instances, no two of which may include the same set of elements.

Example systems and methods facilitate registering, for example, an actual feature using the theoretical feature described in the feature type. Recall that the actual feature instances (e.g., actual buildings) in the actual feature may themselves have spatial content that is hierarchical and/or a collection.

Example systems and methods provide support for indexing WFS feature data. Example systems and methods also provide support for searching WFS feature data. Example systems and methods preserve WFS-locking and transaction semantics while managing spatial collections. Example systems and methods may be implemented using an object-relational database management system.

Example systems and methods facilitate decomposing spatial collection data and storing spatial collection data in containers that facilitate indexing spatial content in a manner where an association between collection content and feature data is maintained.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
URI: uniform resource identifier.
URL: uniform resource locator.
USB: universal serial bus.
WAN: wide area network.
WFS: Web Feature Service, as described, for example, in the WFS Implementation Specification (WFS 1.0.0).
XML: extensible markup language.
XLink describes connections between documents. XLink provides an attribute-based syntax for attaching links to documents. XLink provides an XML syntax for describing directed graphs in which the vertices are documents at particular URIs and the edges are links between the documents. A simple link defines a one-way connection between two resources, the source (e.g., starting resource) is the link element while the target (e.g., ending resource) is identified by a URI. XLinks use locators and arcs. Each locator element has an xlink:type attribute associated with the value locator and an xlink: href attribute containing a URI for the resource it locates. Arcs are paths between resources. Linkbases are XML documents that contain inbound or third-party links. A linkbase may establish links from documents other than the linkbase itself.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

XPath is a non-XML language used to identify particular parts of XML documents. XPath indicates nodes by position, relative position, type, content, and so on. XPath expressions may represent numbers, strings, Booleans, and so on. XPath is a language for picking nodes and sets of nodes out of the tree structure that is an XML document.

XPointer uses XPath expressions to identify the particular point in or part of an XML document to which an XLink links. XPointer addresses individual parts of an XML document.

XSL, as used herein, refers to extensible stylesheet language. XSL includes XSL transformations and XSL formatting objects.

XSLT, as used herein, refers to XSL transformations. XSLT is an XML application that specifies rules by which one XML document is transferred into another. XSLT is a general purpose language for transforming one XML document into another for purposes including, for example, web page display. An XSLT stylesheet contains templates that control what output is created from what input. An element has a "match" attribute that contains an XPath pattern identifying the input it matches. XSLT uses XPath expressions to match and select particular elements in an input document for copying into an output document or for further processing.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital, signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Consider a list L. List L may describe a set of spatial collections associated with an item to be modeled (e.g., city, circuit board). List L may be a collection of spatial collection paths. A spatial collection path may be a normalized path (e.g., a/b/c) which captures a hierarchy from root to leaf. In this example, a feature may include an attribute c whose parent is an attribute b whose parent is in turn an attribute a. A spatial collection path may also be a generic path (e.g., a/b[*]/c, a/b[2]/c) which captures instance specific information associated with hierarchy and/or position within an instance document. In this example, a feature instance may include an attribute c whose parent is an attribute b whose parent is an attribute a. The generic path indicates that attribute b may be a collection (e.g., array) of attributes. Thus, list L may be:

$$L < collection_1, collection_2, \ldots collection_N>$$

A collection may itself be a list. For example:

$$collection_1 => list <path\ p1, path\ p2>$$
$$collection_2 => list <path\ pa, path\ pb>$$
$$\ldots$$
$$collection_N => list <path\ p3, path\ p4>$$

Collection$_1$ may be a list of different generic paths corresponding to sets of possible feature instances. For example, path p1 may represent feature instances corresponding to a/b[*]/c and path p2 may represent feature instances corresponding to a/b[*]/d. Similarly, collection$_n$ may be a list of different generic paths corresponding to sets of possible feature instances. For example, path p3 may represent feature instances corresponding to a/e/g/h[*] and path p4 may represent feature instances corresponding to a/e/f[*]. Different instances may have different cardinality. These collections are related to two mappings presented below in paragraph [0089]. A first mapping is referred to as Mapping1 and/or COLLECTIONMAP_1. A second mapping is referred to as Mapping2 and/or COLLECTIONMAP_2. As described below, for every mapping entry in COLLECTIONMAP_1 there will be a corresponding mapping entry in COLLECTIONMAP_2.

List L describes what might be associated with the item to be modeled. List L describes the structure and hierarchy of the item to be modeled by describing the different feature instances that can be found in the item to be modeled. Any specific item that is modeled may include different subsets of the possible items and may include different numbers of feature instances. For example, a first building may have a first set of rooms having different numbers and types of windows and doors while a second building may have a second set of rooms having different numbers and types of windows and doors. Thus, in one example, path p1 may include feature instances having b[1] through b[7] while p2 may include feature instances having b[1] through b[642]. Similarly, path p3 may include feature instances having h[1] through h[3] and path p4 may include feature instances having f[1] through f[27]. The numbers described are intended to be merely representative and one skilled in the art will appreciate that different feature instances may have lists of different orders.

Registering a feature type will capture information regarding spatial collection paths. Registering a feature type will generate and store the two mappings described above. Registering a feature type will cause a set of tables to be created. The tables will maintain mappings between feature instances and feature instances collection data. The mappings may be maintained in a WFS metadata layer. Registering a feature type will also cause the tables to be indexed using, for example, an r-tree based spatial index. The r-tree based spatial index will be on an ORDB table(s), for example on TC_i.collection_item as described below. Registering a feature type may also cause an object relational schema to be generated to facilitate storing index spatial collection information.

In one example, registering a feature type may include creating a feature instance table T and a set of collection items table TC_i (e.g., TC_1 through TC_N). A table TC_i may be created for each collection item in the collection (e.g., list) of spatial collection paths associated with the feature type. A primary key (e.g., feature instance identifier) may be used to create and maintain an association between a feature instance associated with a collection item table and a parent feature instance table.

In one example, the table T may be stored in a database table having three columns. The three columns may include a primary key column, an xmldata column, and multiple spatial data columns. The primary key may be, for example, a feature instance identifier. The xmldata column may store feature instance content using XML data. The spatial data column(s) may store an SDO_GEOMETRY object(s) that stores actual geometries for an extracted element(s). This object may store the non-collection based spatial content for the entry.

In one example, a TC_i table may also be stored in a database table having three columns. The three columns may include a primary key column, a collection path column, and a collection item column. The primary key may be, for example, a feature instance identifier. The collection path column may be an expanded form of an XPath representing the xpath of the corresponding collection geometry item stored in the collection item column. This collection path column may store data that uniquely reflects the offset of the collection item entry in a feature instance document. In one example, the collection path column may store an instance of a generic path name (e.g., a/b[1]/c). The collection path column may store a list of entries of the form (namespace, name[optional *]) from root to leaf representing a path (e.g., a/b[1]/c/d[1]). The collection item column may store a spatial collection item object (e.g., SDO_Geometry object) that stores collection spatial item content. An r-tree index can be built on the collection item objects stored in the collection item column.

Registering a feature type may include creating the table T and the tables TC_i and then creating an R-tree based spatial index on the collection items stored in the tables TC_i. Spatial collection content processing algorithms can be configured to respect locking protocols described elsewhere.

Recall that a feature type (FT) describes an overall possible structure while a feature instance (FI) describes an actual instance. Recall also that a normalized spatial collection path (e.g., a/b/c) describes hierarchy only while a generic spatial collection path (e.g., a/b[*]/c) describes instance specific information. Thus a set of normalized spatial collection paths may be considered to be metadata describing a feature type. A normalized spatial collection path may have the form of a list of (namespace, name) that represents a/b/c from root to leaf. A generic spatial collection path may have the form of a list of (namespace, name[optional *]) that represents a/b[*]/c from root to leaf.

An FT may include a collection of generic spatial collection paths. This collection may be referred to as CM1 or COLLECTIONMAP$_1$ herein. An FT may also include a collection of normalized spatial collection paths. This collection may be referred to as CM2 or COLLECTIONMAP$_2$ herein. Each entry in CM1 has a corresponding entry in CM2. Example systems and methods preserve a mapping between entries in CM1 and CM2. Registering an FT may include generating feature instance table T and sets of collection items tables TC_i. Registering an FT may therefore also include preserving a mapping between entries in T and the tables TC_i.

To summarize, feature instance data are stored in table T. Feature instance spatial collection data are stored in TC_i. A feature instance spatial collection data row is associated to its feature instance row via a pkCol column reference. The T and TC_i tables are generated during feature type registration based on the spatial collection metadata.

FIG. 1 illustrates a system 100 associated with managing feature data based on spatial collections. System 100 includes a registration logic 110. Registration logic 110 will register a feature type 120. Recall that a feature type 120 includes structural information about both feature data and spatial collection content. In one example, the feature type 120 may be a WFS feature type. Thus, the spatial collection content may include a collection of spatial collection paths. Additionally, the feature metadata includes a set of feature attribute definitions and tag definitions that describe the structure of the feature type.

System 100 also includes an index logic 130. Index logic 130 will produce a spatial index 140 for collection items associated with the spatial collection content associated with the feature type 120. In one example, the spatial index 140 may be an r-tree based spatial index. In this example, the index logic 130 is to populate the r-tree based spatial index 140 with data to index collection items in the collection tables produced by the registration logic 110.

Thus, the spatial index 140 is to be arranged to index feature data based on spatial collection content. This will facilitate the processing of data manipulation actions targeted at a feature instance as well as processing queries (e.g., any interact) targeted at a feature instance.

Figure 2:
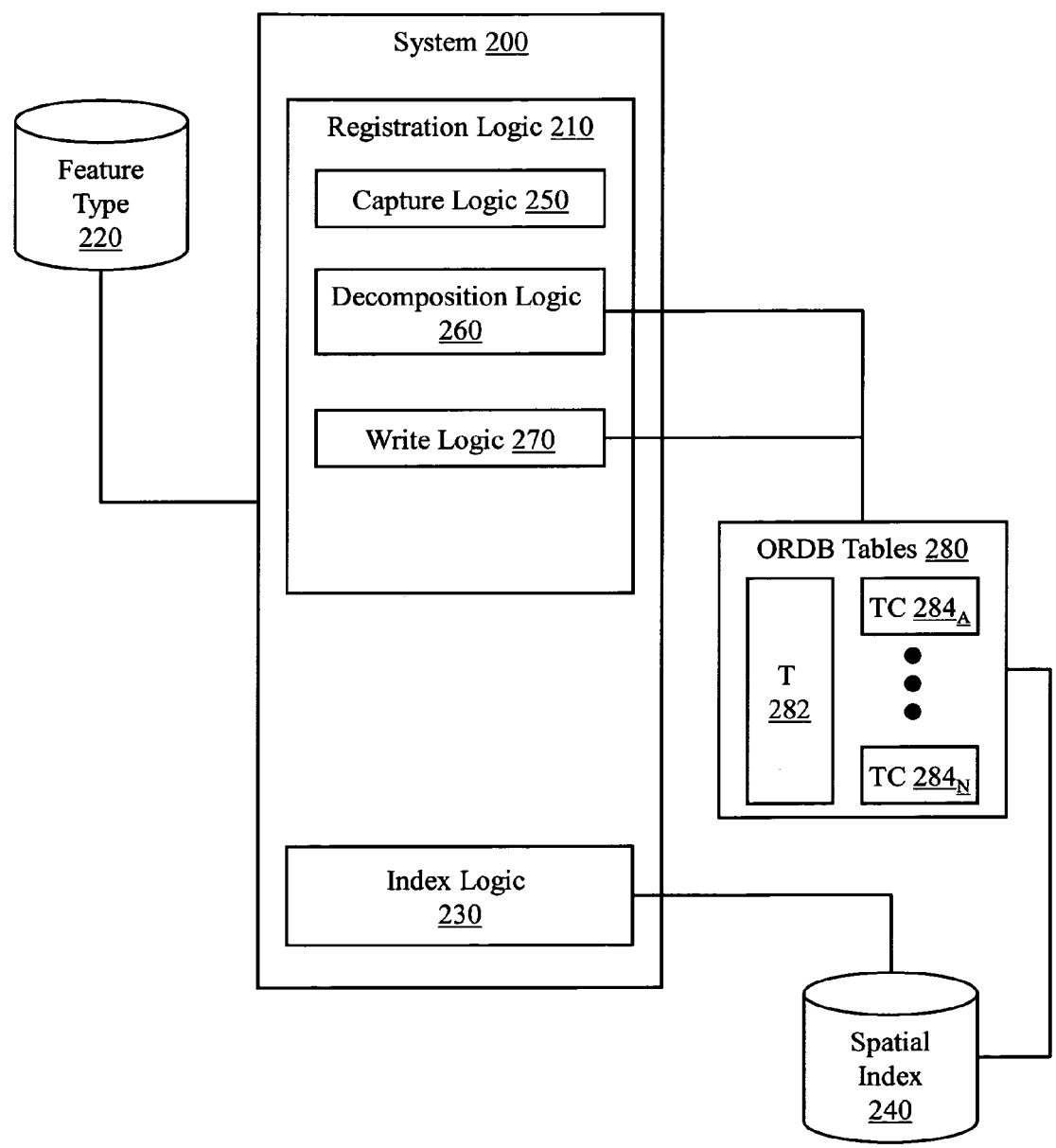
FIG. 2 illustrates another example system associated with managing WFS feature data based on spatial collections.

FIG. 2 illustrates a system 200 associated with managing feature data based on spatial collections. System 200 includes elements similar to those described in connection with system 100 (FIG. 1). For example, system 200 includes a registration logic 210 to register a feature type 220 and an index logic 230 to produce a spatial index 240. Spatial index 240 is built on ORDB tables 280. System 200 further characterizes registration logic 210.

For example, the registration logic 210 includes a capture logic 210 to capture the spatial collection content metadata. Capturing the spatial collection content metadata may include identifying sets of collection content paths as described in connection with system 300 (FIG. 3).

The registration logic 210 also includes a decomposition logic 260 to decompose the spatial collection content metadata into a set of decomposed data. In one example, to decompose the spatial collection content metadata, the decomposition logic 260 is to create a set of object relational database tables 280. The tables 280 may include a feature instance table 282 to store the feature content. The feature content may include a geometry object for an extracted item. The geometry object may be, for example, an SDO_GEOMETRY object. To decompose the spatial collection content, the decomposition logic 260 is also to create a set of collection tables (e.g., $284_A$ through $284_N$) for collection items in the collection of generic paths corresponding to the feature type. This decomposition may include storing geometry objects associated with collection items in the set of collection tables $284_A$ through $284_N$.

The registration logic 210 also includes a write logic 270. Write logic 270 is to store the set of decomposed data in the set of object relational database tables 280. The decomposed data is to be stored in a manner that maintains associations between feature instance spatial collection content data and feature instance data. For example, primary key columns in different tables in the set of tables 280 may relate entries using feature instance identifiers. In one example, the write logic 270 is to store a set of rows in the feature instance table 282 where the rows include a primary key column to store a feature instance identifier, an xmldata column to store a feature instance content, and geometry column(s) to store non-collection based spatial content. While three columns are identified, it is to be appreciated that the order of the columns may vary and that additional columns may be included. In this example, the write logic 270 is also to store a set of rows in members of the set of the collection tables $284_A$ through $284_N$. A row inserted in a collection table is to include a primary key column to store a feature instance identifier, a collection XPath column to store data that uniquely reflects the offset of the collection-item entry in a feature instance document, and a collection item column to store collection spatial item content. Once again, while three columns are listed, column order may vary and additional columns may be included in different examples. In one example, the geometry column in the feature instance table 282 is to store an SDO_GEOMETRY object and the collection item column in the collection tables $284_A$ through $284_N$ are to store an SDO_GEOMETRY object.

Figure 3:
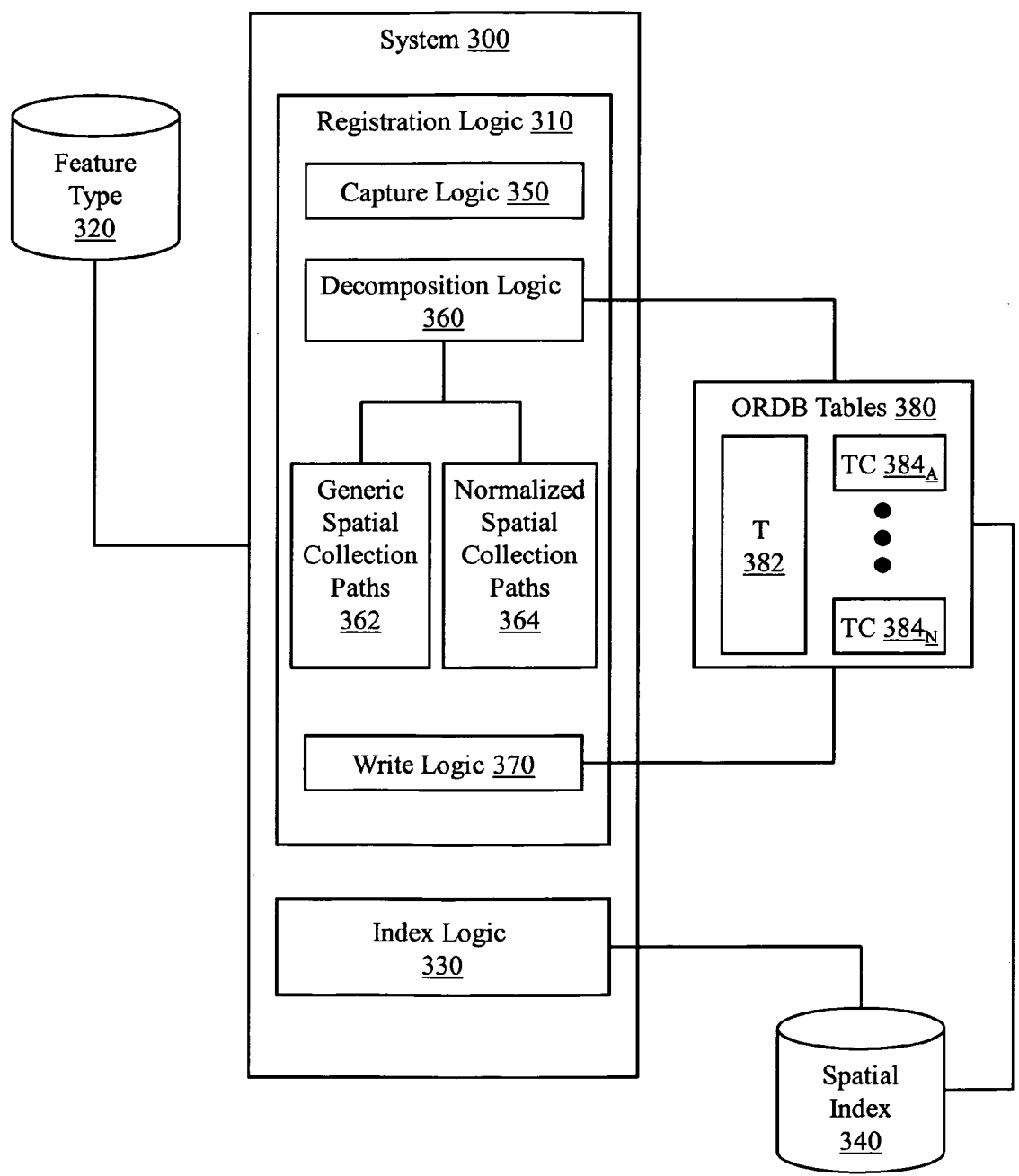
FIG. 3 illustrates another example system associated with managing WFS feature data based on spatial collections.

FIG. 3 illustrates a system 300 associated with managing feature data based on spatial collections. System 300 includes elements similar to those described in connection with system 200 (FIG. 2). For example, system 300 includes a registration logic 310 to register a feature type 320 and an index logic 330 to produce a spatial index 340. Registration logic 310 includes a capture logic 350, a decomposition logic 360, and a write logic 370. However, system 300 further characterizes decomposition logic 360.

In one example, to capture the spatial collection content metadata, the capture logic 350, working together with the decomposition logic 360, is to identify a collection 362 of generic spatial collection paths associated with the feature type 320. Additionally, the capture logic 350 working with the decomposition logic 360 is to identify a collection of normalized spatial collection paths associated with the feature type 320. Having identified collection 362 and collection 364, the decomposition logic 360 is to establish and maintain a set of mappings between the feature type 320 and the collection 364 of normalized spatial collection paths. Recall that a generic spatial collection path is a list of patterns described using (namespace, name) pairs where the name may include an optional array indicator. The pattern represents a hierarchy from root to leaf in a feature instance which contain spatial collection elements. Recall also that a normalized spatial collection path is a list of patterns described using (namespace, name) pairs. The pattern represents a hierarchy from root to leaf in a feature instance. Due to the relationship between normalized spatial collection paths and generic spatial collection paths, there will be an entry in the collection 364 of normalized spatial collection paths for each entry in the collection 362 of generic spatial collection paths. Pseudocode associated with establishing and maintaining mappings in a WFS metadata layer is provided below.

```
Mapping 1, (may be referred to as COLLECTIONMAP_1)
FT --> CollectionOf< generic spatialCollectionPaths>
    //where generic spatialCollectionPaths is
    // collection of spatial path patterns, List<pattern1, pattern2>
    // each pattern could be a list of (namespace, name[optional *])
    // from root to leaf e.g. representing a/b[*]/c/d[*])
    // [*] is interpreted as follows;
    // e.g. a/b[*]/c/d[*] implies that a/b is an array, and a/b[*]/c/d
    is an array.
Mapping 2, (may be referred to as COLLECTIONMAP_2)
FT --> CollectionOf<normalized spatialCollectionPaths>
    // where normalized spatialCollectionPaths is
    // collection of normalized spatial path patterns
    // which represents the hierarchy of a path pattern from root to leaf
    // e.g. list of (namespace, name)) e.g. representing a/b/c/d)
    // for every mapping entry in COLLECTIONMAP_1
    // there is a corresponding mapping entry in COLLECTIONMAP_2.
//Capture information regarding spatial collection paths
// during feature type registration
// generate the corresponding object relational schema to store and
// index the spatial collection information:-
For a Feature Type (FT),
    create a feature instance Table "T" to store the feature content
For each collection item in "CollectionOf<spatialCollectionPaths>" in
    [COLLECTIONMAP_1 ] corresponding to FT,
    create a table "TC_i" to store the corresponding collection items
    // this maintains association with parent feature instance
    relational table.
Table T Structure
T (PKCOL varchar2, -- stores feature instance id
data   XMLType, -- stores the feature instance content
spatialCol_0 SDO_GEOMETRY, ..spatialCol_i SDO_GEOMETRY)
// stores
    // non-collection based spatial content
Collection Table Structure
TC_1(PKCOL varchar2 references T(PKCOL) on delete cascade,
    // maintains association between TC_1.PKCOL and T.PKCOL
collection_xpath varchar2, // expanded form of the xpath
        // uniquely reflects the offset of collection item entry in
        // entire feature instance document
        // list of (namespace, name[optional actual array index])
        // from root to leaf e.g. representing a/b[1]/c/d[1]
collection_item SDO_GEOMETRY); // object column
                // stores collection spatial item content
...
TC_N(PKCOL varchar2 references T(PKCOL) on delete cascade,
collection_xpath varchar2,
collection_item SDO_GEOMETRY);
Process List
Let L be:
the CollectionOf<spatialCollectionPaths> for FT from
COLLECTIONMAP_1
for i =1 ; i <= sizeOf(L) do :
    create index on TC_i (collection_item) index type spatial;
    // creates R-Tree index on the corresponding spatial column.
```

Figure 4:
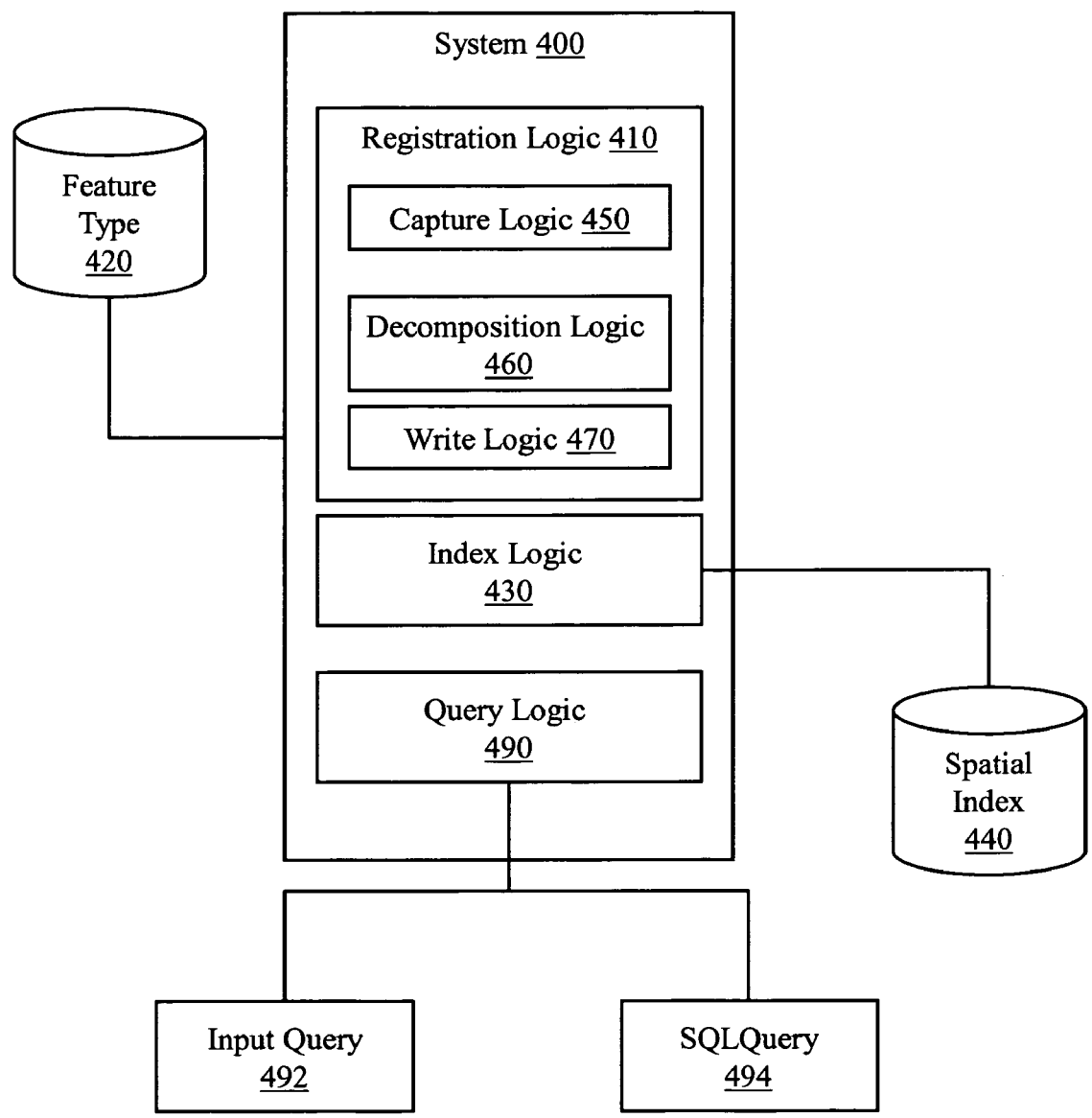
FIG. 4 illustrates another example system associated with managing WFS feature data based on spatial collections.

FIG. 4 illustrates a system 400 associated with managing feature data based on spatial collections. System 400 includes elements similar to those described in connection with system 300 (FIG. 3). For example, system 400 includes a registration logic 410 to register a feature type 420 and an index logic 430 to produce a spatial index 440. Registration logic 410 includes a capture logic 450, a decomposition logic 460, and a write logic 470. System 400 also includes a query logic 490.

Query logic 490 is to accept an input query 492 associated with a feature instance associated with the feature type 420. Query logic 490 is to process the input query 492 using the spatial index 440. The input query 492 may seek to determine whether a certain feature instance has a spatial interaction with another feature instance. The spatial interaction may be, for example, intersect, any interact, enclosed by, within distance, and so on.

In one example, the input query 492 may be a WFS query. In this example, the query logic 490 is to produce an SQL query 494 from the WFS input query 492 and then to process the SQL query 494 based on the captured spatial collection content. The processing will include locating relevant feature instances using the r-tree based spatial index 440.

In one example, the WFS query may include an XPath spatial based filter condition. In this example, the query logic 490 is to generate an SQL query select clause, an SQL from clause, and an SQL where clause. These SQL clauses are to correspond to the spatial collection based XPath filter condition. Producing these three clauses and transforming a received WFS query to an SQL query may include generating three predicates associated with the SQL query. These three predicates include a referential integrity predicate, an XPath matching predicate, and a spatial operator predicate. Pseudocode associated with one process performed by query logic 490 is provided below.

Query ( )

```
From the query_array_based_path
// which is a list of (namespace,name[optional actual array index or *]
// from root to leaf representing xpath p1/p2[i]/p3)
generate a normalized expanded format of the path pattern
// which has list format of (namespace,name)) representing (p1/p2/p3) (say NP)
Let GP represent a generic representation of spatial collection based xpath
// which is list format of (namespace,name[optional *])) representing p1/p2[*]/p3
From p1 deduce the Feature Type (FT) which is queried.
From FT compute the List of feature_collection_index (FCI)
set as follows:
      From WFS metadata [COLLECTIONMAP_2]
            for a given feature Type (FT): get
               "CollectionOf<normalized spatialCollectionPaths>"
      // which will be a of the form List<collection_i>,
      // where each collection_i could be a List<normalized pathPattern_j>
UFCI = {empty set} // UFCI is a the set of unique FCI's such that a path
                  // collection_FCI matches NP
For each collection_i in List<collection_i>
      exactMatchPaths_i = {empty set} // set contains all the paths that will be
         // matched with "=" operator with the paths in the collections
         // schema (TC_i.collection_xpath) for collection_i
      likeMatchPaths_i = {empty set} // set contains all the paths that will be
         // matched with "like" operator with the paths in the collections
         // schema (TC_i.collection_xpath) for collection_i
      For each normalized pathPattern_j in List<normalized pathPattern_j>
            which is part of collection_i do:
            if normalized pathPattern_j = NP then
               let pathPattern_j be the corresponding generic path entry
                  (for the normalized pathPattern_j) in the COLLECTIONMAP_1
               if (GP = pathPattern_j and
                  query_array_based_path does not contain the pattern '[*]') then
                  exactMatchPaths_i = exactMatchPaths_i Union
                     query_array_based_path
               else
                  likeMatchPaths_i = likeMatchPaths_i Union
                     likePatternRepresentation(query_array_based_path, pathPattern_j);
               end if;
            UFCI = UFCI Union { i };
            end if;
      end for;
end for;
      Query the feature table "T" and relevant collection tables "TC_<FCI>" and apply
the spatial collection xpath and geometry constraint and then join the two tables to get the
desired feature instance content as follows:
         1) In the select clause of the query,
               select the feature data from feature table "T.data"
                  // provided it is not already selected in the select clause
         2) In the from clause of the query,
               add parent feature table T, and TC_FCI for each entry in UFCI
                  //provided they are not already defined in the from clause
         3) In the where clause,
               add the following where clause conditions corresponding to the entries in
            UFCI: (Say UFCI = {f1, f2, ...fN})
               (cond_f1 OR cond_f2 OR .. cond_fN )
               // which will represent the spatial collection based condition
               // (/p1/p2[i]/p3 spatialOp <query_geometry>);
```

| Query ( ) |
|---|
|     where each cond_fi is of the form:<br>        (Predicate1 AND Predicate2 AND Predicate3 )<br>        where:<br>  Predicate1 is : T.pkCol = TC_fi.pkCol // referential integrity predicate,<br>        // representing the referential integrity between<br>        // parent Feature table "T" and collection table "TC_fi"<br>  Predicate2 is : pathMatchingCondition_fi // query xpath matching predicate<br>  Predicate3 is : spatialOp(TC_fi.collection_item, <query_geometry>) )<br>        // query spatial operator based predicate<br>        // spatialOp operator will use the spatial R-Tree index that is created<br>        // on TC_fi.collection_item column<br>        // Predicate1 and Predicate2 are generated in cond_fi as stated above in<br>        // the where clause only if they have not been already included in the<br>        // where clause as part of some other spatial collection based condition in<br>        // the filter condition.<br>Path Matching<br>- pathMatchingCondition_fi is of the following form 1) or 2):<br>1) exactMatchingCondition_fi OR likeMatchingCondition_fi<br>    (if exactMatchPaths_fi contains query_array_based_path)<br>2) likeMatchingCondition_fi<br>    (if exactMatchPaths_fi does not contains query_array_based_path)<br>- exactMatchingCondition_fi is of the following form:<br>TC_fi.collection_xpath = query_array_based_path<br>    (if exactMatchPaths_fi contains query_array_base_path)<br>- likeMatchingCondition_fi is of the following form:<br>(TC_fi.collection_xpath LIKE LP1<br>OR TC_fi.collection_xpath LIKE LP2<br>..OR TC_fi.collection_xpath LIKE LPN)<br>( where likeMatchPaths_fi = {LP1, LP2, ...LPN))<br>Like Pattern Representation<br>likePatternRepresentation(query_array_based_path, genericPathPattern)<br>{<br>Let query_array_based_path = List(P1, P2, ..Pn),<br>    where each Pi = <namespace, name[optional actual array index or *]><br>Let genericPathPattern = = List(PP1, PP2, ..PPn),<br>    where each PPi = <namespace, name[optional *]><br>resList = {empty List}<br>for i = 1 to n do<br>    if(Pi = PPi and Pi does not contain '[*]')<br>        resList = resList.add(Pi); // add ( ) adds and entry at end of list<br>    else<br>        if(Pi is of the form <namespace, name[actual array index]>)<br>            resList = resList.add(Pi);<br>        else<br>            if(Pi = PPi and Pi has '[*]')<br>                resList = resList.add(transform(PPi));<br>            // where transform(PPi) replaces all '*' (if any) in PPi with<br>            // the wildcard matching character '%'<br>            // Note 'p[i]' LIKE 'p[%]' return true.<br>            else<br>                If(Pi is not array element and PPi has '[*]')<br>                      resList = resList.add(Pi[1]);<br>                else<br>                      resList = resList.add(Pi);<br>                end if;<br>            end if;<br>        end if;<br>    end if;<br>end for;<br>return resList; // return like pattern representation of the query_array_based_path<br>            // corresponding to the genericPathPattern passed as the<br>            // second parameter of this method<br>} //end likePatternRepresentation |

Figure 5:
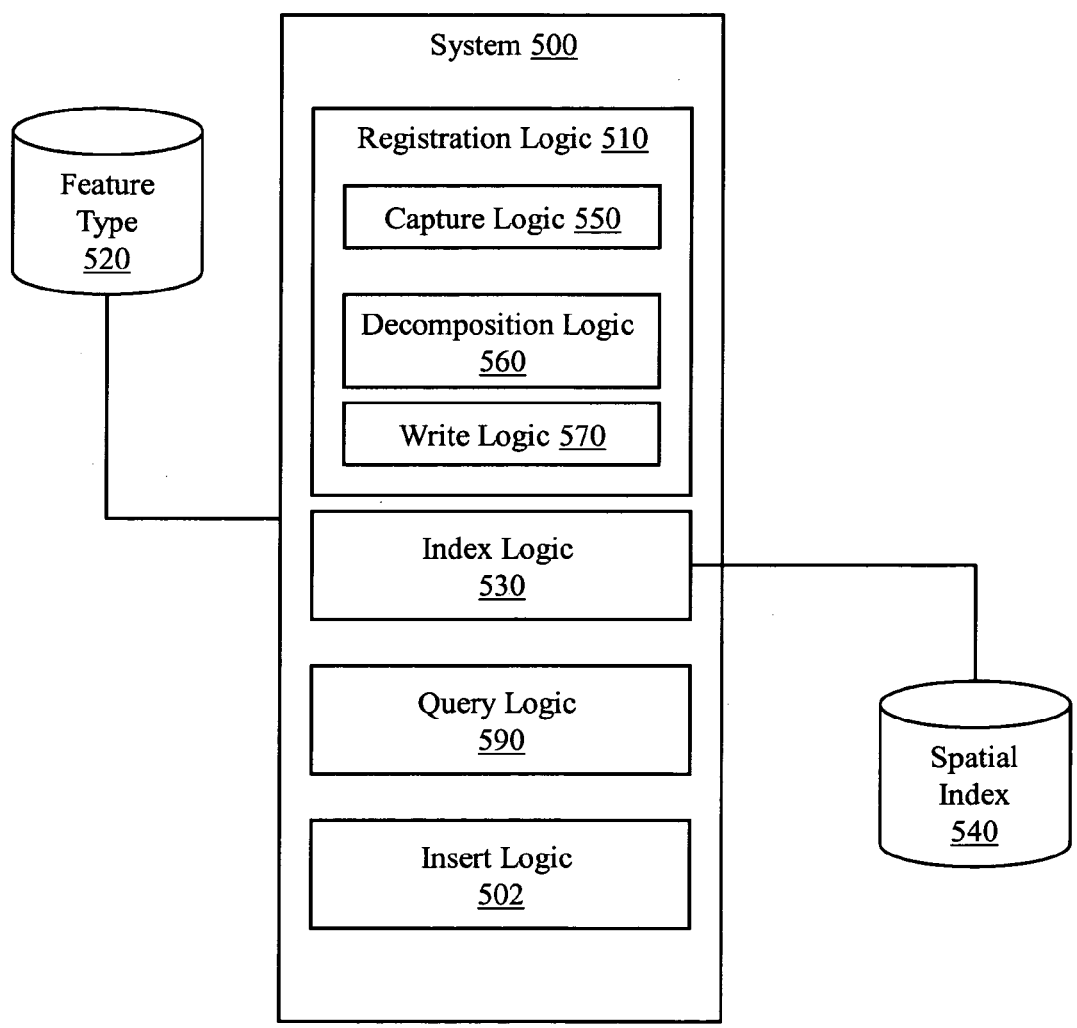
FIG. 5 illustrates another example system associated with managing WFS feature data based on spatial collections.

FIG. 5 illustrates a system 500 associated with managing feature data based on spatial collections. System 500 includes elements similar to those described in connection with system 400 (FIG. 4). For example, system 500 includes a registration logic 510 to register a feature type 520 and an index logic 530 to produce a spatial index 540. Registration logic 510 includes a capture logic 550, a decomposition logic 560, a write logic 570, and a query logic 590. System 500 also includes an insert logic 502.

Insert logic 502 will insert a received feature instance into a feature instance table. Inserting the feature instance into the feature instance table may involve a number of actions. The actions performed by the insert logic 502 may include identifying a primary key associated with the received feature instance. Recall that both a feature table and a collection item table may include a primary key column based, for example, on a feature instance identifier. Having identified a primary key, insert logic 502 may acquire from a collection of generic spatial collection paths a collection of spatial collection paths associated with the received feature instance. This may provide hierarchy information useful for identifying tables with which a feature instance may interact. As per the path index in the list, the insert logic 502 may identify a collection table storing collection items corresponding to paths in a member of the collection of spatial collection paths. Thus, actual collection tables associated with the feature instance to be inserted may be identified. With the actual set of tables identified, insert logic 502 may identify a finite enumeration of XPaths corresponding to a path associated with a collection item in the identified collection table. This finite enumeration identifies actual entries that may need to be manipulated to perform the insertion. With the finite enumeration in hand, the insert logic 502 may generate an SDO_GEOMETRY object for an enumeration entry in the finite enumeration and then insert a row into a collection table. The row may include, for example, the primary key, the enumeration entry, and the SDO_GEOMETRY object. Pseudocode associated with one example insertion process is provided below.

---
Insert( )
---
- find the PKCol value
// which is the primary key for the feature instance to be inserted,
- From the WFS Feature metadata [COLLECTIONMAP_1]
    get the "CollectionOf<spatialCollectionPaths>" Information
    // which will be a of the form List<collection_i>
    // where each collection_i could be a List<pathPattern_j>
- for each collection_i in List<collection_i> do:
    - Let TC_i be the collection table storing collection items
      corresponding to the paths in collection_i
    - for each pathPattern_j in List<pathPattern_j> of collection_i do:
      - Find the finite enumeration (E) of the XPaths
      // expanded format,
      // list of (namespace, name[optional actual array Index]) pairs
      // that exists in feature instance document corresponding to
      // pathPattern(P)
      - for each entry in the E
        - find the corresponding GML component
        - convert to SDO_GEOMETRY format (say geom)
        // construct spatial index (namely R-Tree Index).
        - insert into TC_i values (pkCol, E, geom);
      - end for; // for each E
    - end for; // for each pathPattern_j
- end for; // for each collection_i

---

Figure 6:
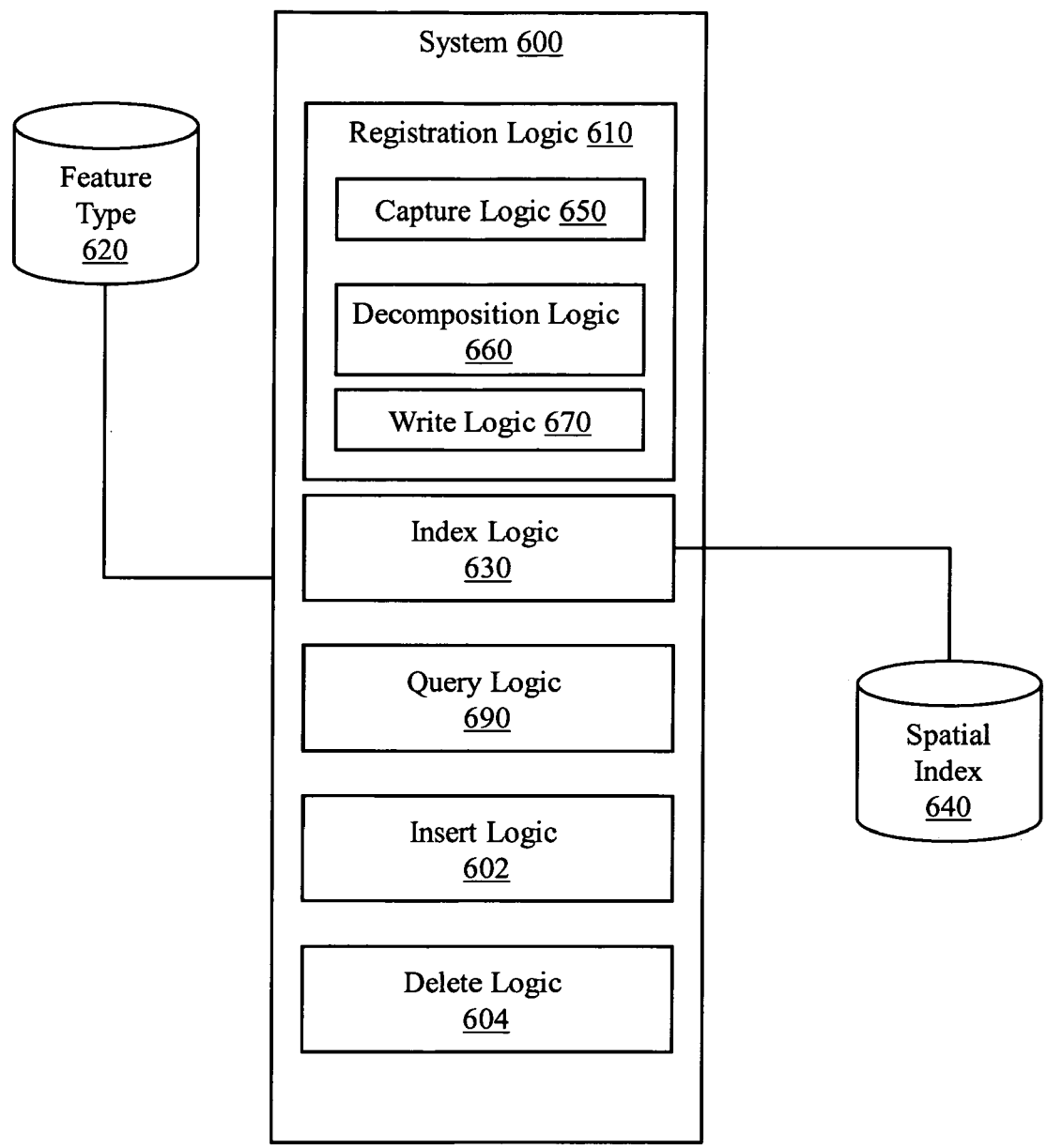
FIG. 6 illustrates another example system associated with managing WFS feature data based on spatial collections.

FIG. 6 illustrates a system 600 associated with managing feature data based on spatial collections. System 600 includes elements similar to those described in connection with system 500 (FIG. 5). For example, system 600 includes a registration logic 610 to register a feature type 620 and an index logic 630 to produce a spatial index 640. Registration logic 610 includes a capture logic 650, a decomposition logic 660, a write logic 670, an insert logic 602, and a query logic 690. System 600 also includes a delete logic 604.

Delete logic 604 will delete an identified feature instance. The delete logic 604 may perform a series of actions to delete the identified feature instance. For example, the delete logic 604 may acquire a lock for a feature row in the feature instance table. The feature row will be a row associated with the identified feature instance. Delete logic 604 may then delete the feature instance row from the feature table. Deleting the feature instance row may include, for example, controlling a relational database management system to perform the actual deletion. Since rows may be associated with other entries in the same or other tables, the relational database management system may delete other entries upon deleting the row to maintain referential integrity. Having deleted the row and/or having caused the row to be deleted, the delete logic 604 may then release the lock. Pseudocode associated with one example deletion process is provided below.

---
Delete( )
---
- Take action to respect WFS locking
// enables delete of the underlying collection tables based on
// triggers defined on the collection tables (TC_<i> tables).
- Delete the corresponding feature instance row from "T"
// due to referential integrity constraint on all TC_<i>
// corresponding collection related dependant rows will automatically
be deleted.
- Take action to further respect WFS locking

---

Figure 7:
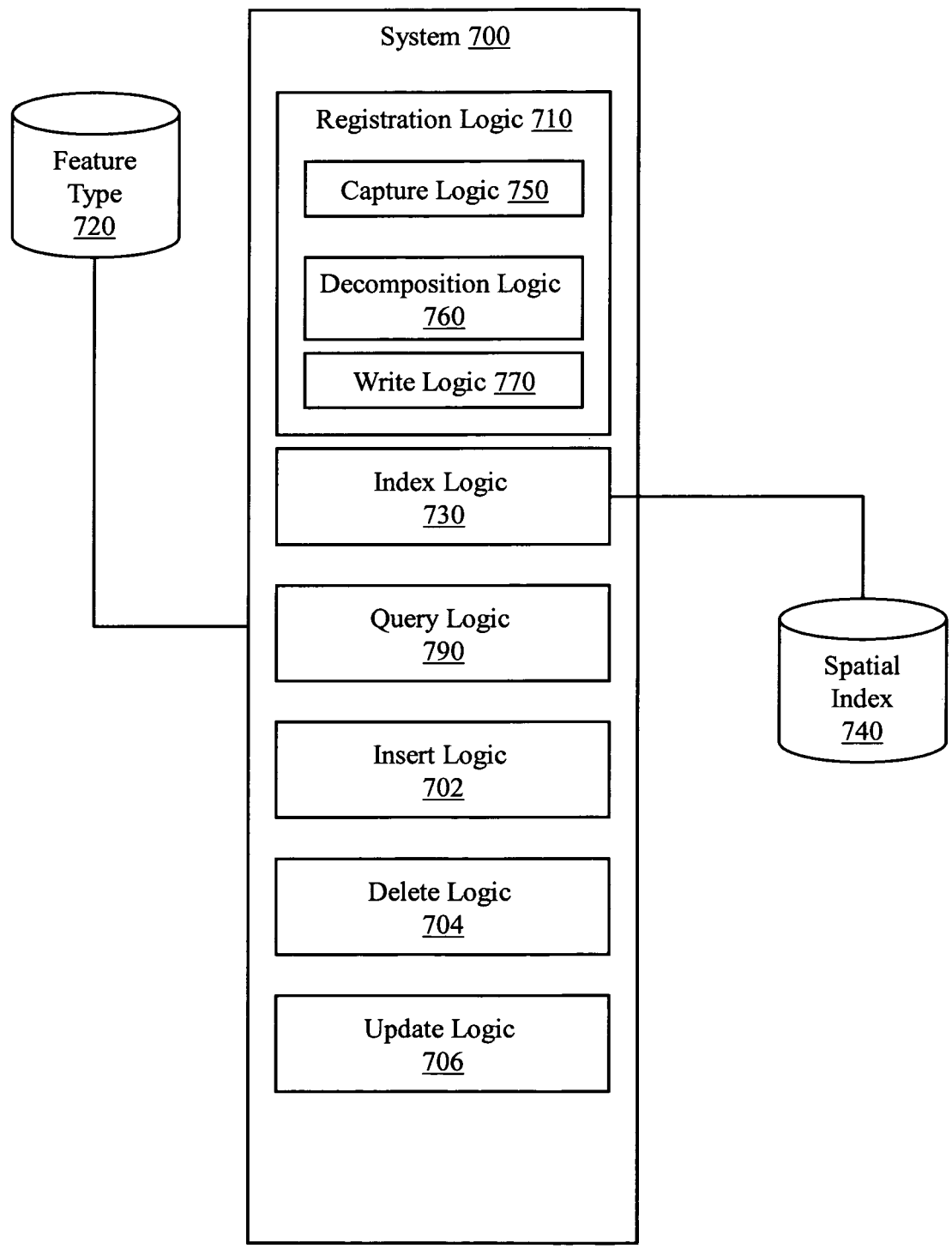
FIG. 7 illustrates another example system associated with managing WFS feature data based on spatial collections.

FIG. 7 illustrates a system 700 associated with managing feature data based on spatial collections. System 700 includes elements similar to those described in connection with system 600 (FIG. 6). For example, system 700 includes a registration logic 710 to register a feature type 720 and an index logic 730 to produce a spatial index 740. Registration logic 710 includes a capture logic 750, a decomposition logic 760, a write logic 770, an insert logic 702, a delete logic 704, and a query logic 790. System 700 also includes an update logic 706.

The update logic 706 will update a specified feature instance to an updated feature instance. To perform the update, update logic 706 may perform a delete and then an insertion. Thus, in one example, the update logic 706 is to control the delete logic 704 to delete the specified feature instance and then to control the insert logic 702 to insert the updated feature instance. Pseudocode associated with one example update process is provided below.
Update ( )

---
Update( )
---
-Take Action to respect WFS locking
// Enables update of the underlying collection tables
// based on the triggers defined on the collection tables
- find the PKCol value
// which is the primary key for the feature instance to be updated,
- From the WFS Feature metadata [COLLECTIONMAP_2]
    get the "CollectionOf<normalized spatialCollectionPaths>"
    Information
    // which will be a of form List<collection_i> (say LC)
    // where each collection_i could be a List<normalizedpathPattern_j>
- From the list LC
    find a subset of LC (say SLC)
    // where getIndex(SLC_i) returns the original index of the SLC_i
    // entry in LC which are updated by the xpaths in update command.
    // The XPaths in update command will be first converted to expanded
    // normalized then will be compared with expanded normalized path
    // patterns of LC derived from [COLLECTIONMAP_2]
-for each entry in SLC (say SLC_i) do
    - N = getIndex(SLC_i);
    - delete from TC_N where PKCOL = pkCol;
    - Find the finite enumeration (E) for the selected XPaths in SLC
      entry from corresponding mapping entries in
      [COLLECTIONMAP_1]
    - for each entry in the E
      - find the corresponding GML component
      - convert to SDO_GEOMETRY format (say geom)
      - insert into TC_N values (pkCol, E, geom);
    - end for; // for each E
- end for; // for each SLC entry
- Take action respect WFS locking

---

Figure 8:
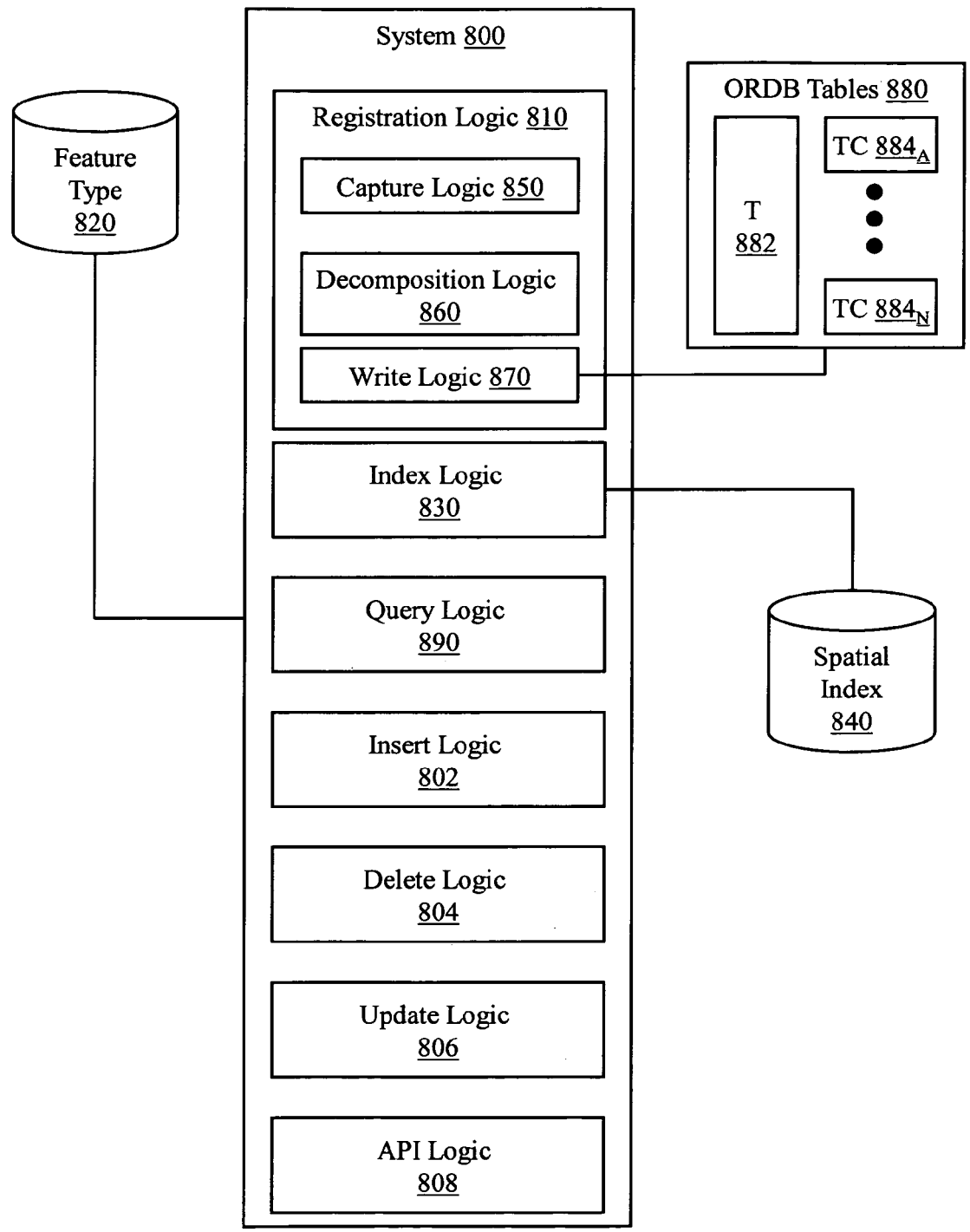
FIG. 8 illustrates another example system associated with managing WFS feature data based on spatial collections.

FIG. 8 illustrates a system 800 associated with managing feature data based on spatial collections. System 800 includes elements similar to those described in connection with system 700 (FIG. 7). For example, system 800 includes a registration logic 810 to register a feature type 820 and an index logic 830 to produce a spatial index 840. Registration logic 810 includes a capture logic 850, a decomposition logic 860, a write logic 870, an insert logic 802, a delete logic 804, an update logic 806, and a query logic 890. System 800 also includes an API logic 808.

In one example, API logic 808 is to provide an API associated with publishing and/or registering WFS feature types. The API may include, for example, a publish/register feature type. This API publishes feature types. The API has a parameter to specify XPaths in a feature type XSD having spatial content and another parameter to specify a list of spatial collection related Xpaths that contain spatial collection data. While two interface parameters are described, it is to be appreciated that a greater and/or lesser number of interface parameters may be provided by API logic 808. API logic 808 generates and stores feature type metadata in a WFS metadata layer. After a feature type is published/registered, instances of the feature type can be manipulated (e.g., inserted, updated, deleted). API logic 808 produces a single publish/register feature type API. This API can register/publish features types based on parameters available to the API.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 9:
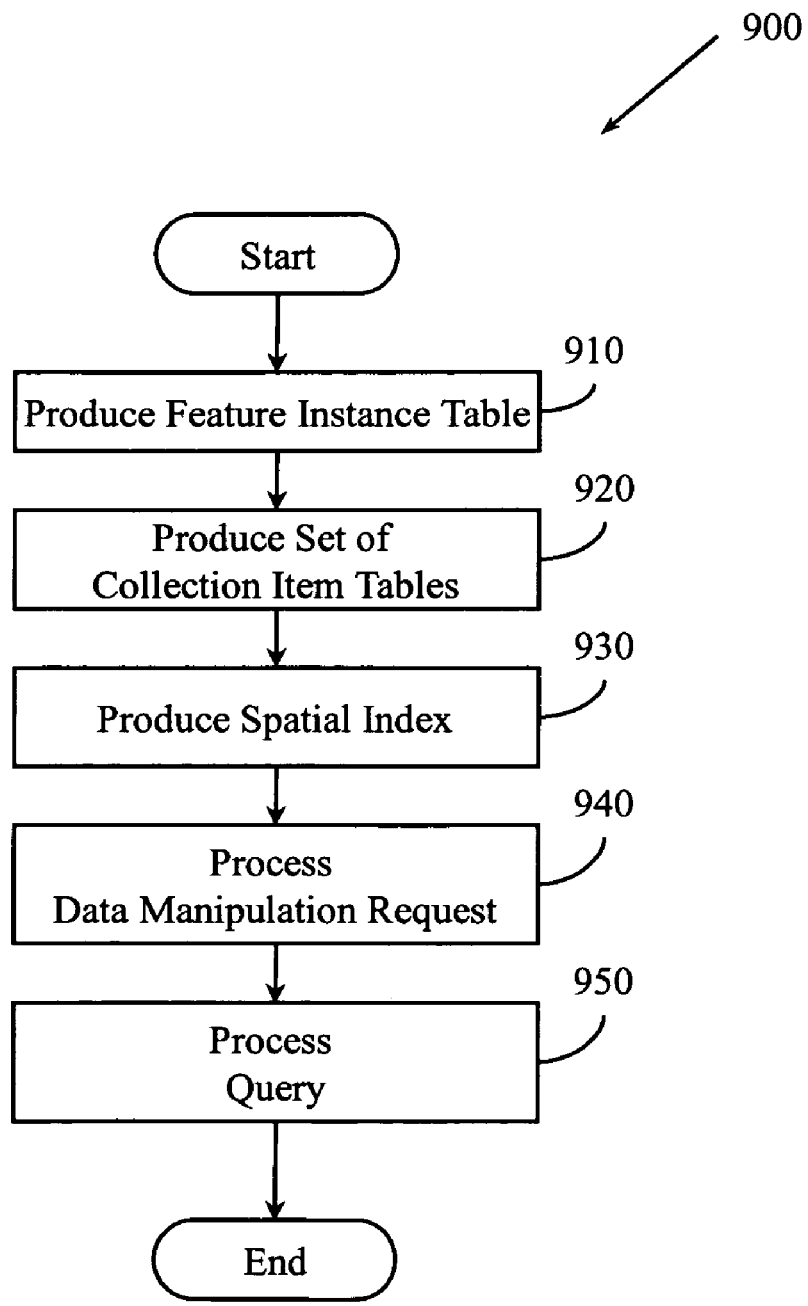
FIG. 9 illustrates another example method associated with managing WFS feature data based on spatial collections.

FIG. 9 illustrates a method 900 associated with managing feature data based on spatial collections. Method 900 includes, at 910, producing a feature instance table and, at 920, producing a set of collection item tables. The feature instance table and the set of collection item tables may be used to register a WFS feature type. Recall that a feature type may include feature data and a spatial collection content. To maintain relationships between feature instances and feature data, elements of the feature instance table and elements of a collection table may be related by a feature instance primary key value. The primary key value may be, for example, a feature instance identifier.

Method 900 may also include, at 930, producing an r-tree based spatial index associated with the feature instances associated with the WFS feature type. Producing the spatial index for members of spatial collections facilitates processing queries on feature instances. For example, queries including an "any intersection" query may be handled efficiently using the r-tree based spatial index.

Method 900 may also include, at 940, selectively processing a data manipulation request associated with a feature instance. Since metadata concerning a feature type may be available in mappings of spatial collection paths, and since actual data concerning a feature instance may be available in the set of collection item tables, processing the data manipulation request may include accessing both the feature instance table and the set of collection item tables.

Method 900 may also include, at 950, selectively processing a query associated with a feature instance. As described above, an r-tree based spatial index is created at 930. Processing the query at 950 may involve locating candidate feature instances using the r-tree based spatial index.

While FIG. 9 illustrates various actions occurring in serial, it is to be appreciated that various actions illustrated in FIG. 9 could occur substantially in parallel. By way of illustration, actions 910 through 930 must occur serially and then actions 940 and 950 may occur in parallel.

In one example, a method may be implemented as computer executable instructions. Thus, in one example, a computer-readable medium may store computer executable instructions that if executed by a machine (e.g., processor) cause the machine to perform method 900. While executable instructions associated with method 900 are described as being stored on a computer-readable medium, it is to be appreciated that executable instructions associated with other example methods described herein may also be stored on a computer-readable medium.

Figure 10:
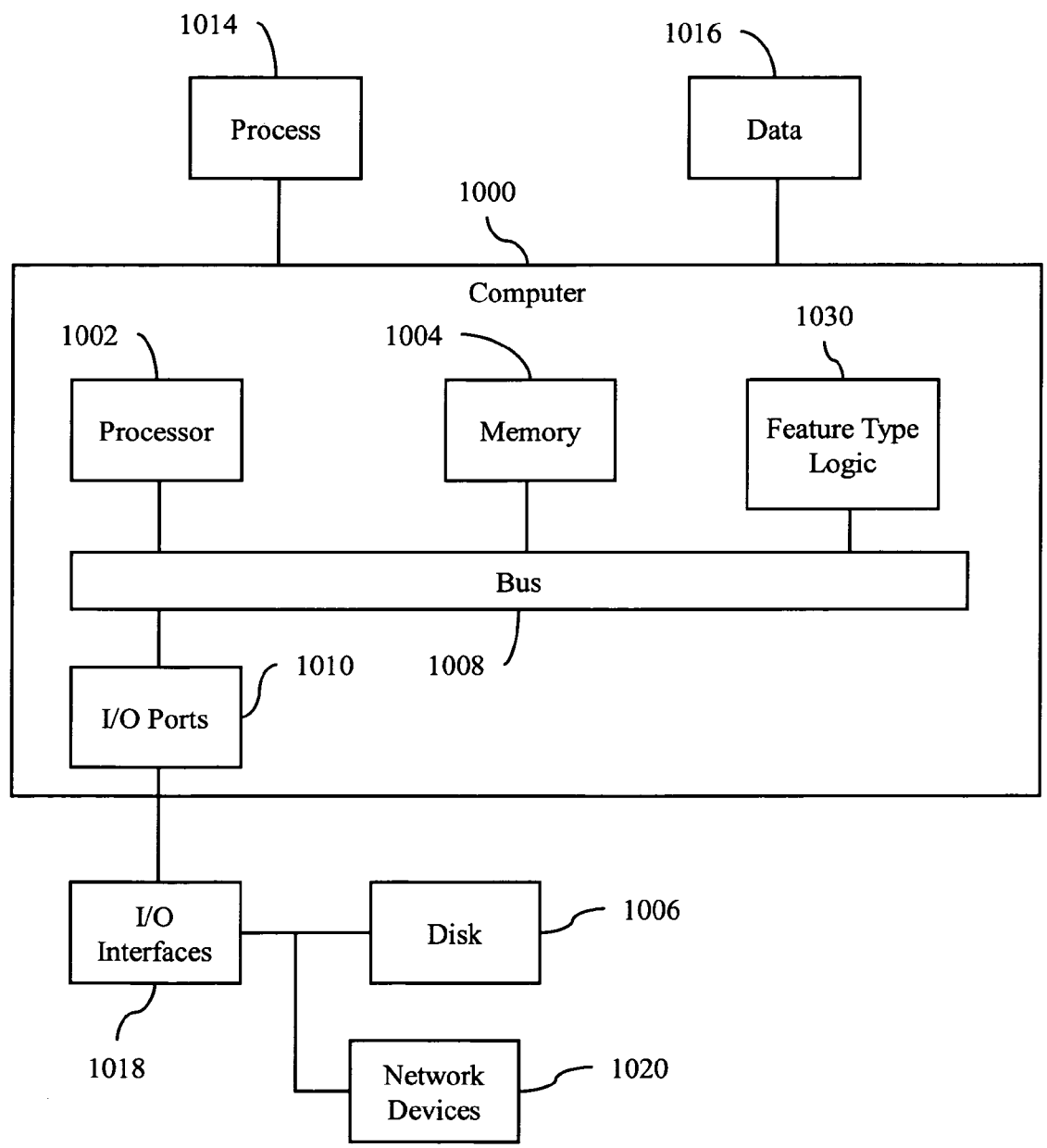
FIG. 10 illustrates an example computing environment in which example systems and methods, and equivalents, may operate.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a feature type logic 1030 configured to facilitate registering a feature type. In different examples, the logic 1030 may be implemented in hardware, software, firmware, and/or combinations thereof. While the logic 1030 is illustrated as a hardware component attached to the bus 1008, it is to be appreciated that in one example, the logic 1030 could be implemented in the processor 1002.

Thus, logic 1030 may provide means (e.g., hardware, software, firmware) for registering a WFS feature type. Registering the WFS feature type may include, for example, producing a set of object relational database tables. The tables may include a feature instance table and a set of collection item tables. Registering the WFS feature type may also include producing an r-tree based spatial index for spatial content collection items stored in the set of collection item tables. The means may be implemented, for example, as an ASIC programmed to manipulate physical values in computer memory 1004. The means may also be implemented as computer executable instructions that are presented to computer 1000 as data 1016 that are temporarily stored in memory 1004 and then executed by processor 1002.

Logic 1030 may also provide means (e.g., hardware, software, firmware) for processing a WFS request to manipulate a WFS feature instance. The manipulating may include, for example, adding a feature instance, deleting a feature instance, updating a feature instance, and so on. The manipulating may be based, at least in part, on the feature instance table and the set of collection item tables. For example, a feature instance may be navigated to using information stored in the feature instance table and actual physical values associated with a feature instance that are stored in a collection item table may be physically transformed by the manipulation. Logic 1030 may also include means for processing a WFS query associated with a WFS feature instance. Since a spatial index was created during registration of the WFS feature type, the query may be processed using the r-tree based spatial index.

Generally describing an example configuration of the computer 1000, the processor 1002 may be a variety of various processors including dual microprocessor and other multiprocessor architectures. A memory 1004 may include volatile memory and/or non-volatile memory. Non-volatile memory may include, for example, ROM, PROM, and so on. Volatile memory may include, for example, RAM, SRAM, DRAM, and so on.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, the system comprising:
    a non-transitory computer-readable medium storing an application program interface (API) logic to provide an API associated with publishing and registering a feature type, where the API accepts a first parameter that captures paths in a feature type definition having spatial content, and accepts a second parameter that captures a list of spatial collection related paths that contain spatial collection based content;
    the feature type comprising:
        a feature metadata including a set of feature attribute definitions and tag definitions that describe the structure of the feature type, and
        a spatial collection content metadata including a collection of spatial collection paths comprising a collection of generic spatial collection paths that describe instance specific information of the feature type, a collection of normalized spatial collection paths that describe a hierarchy of spatial elements, and a set of mappings between the feature type and the collection of normalized spatial collection paths, wherein the set of mappings describes an association between the collection of generic spatial collections paths for the feature type and the collection of normalized spatial collection paths;
    an index logic to produce a spatial index for collection items associated with the spatial collection content metadata, wherein the spatial collection content metadata determines the creation of collection storage tables and the creation of collection storage indices;
    wherein the API logic selectively processes a data manipulation request associated with feature instance data based, at least in part, on a feature instance data table and a set of collection feature instance spatial content data tables;
    wherein elements of the feature instance table and elements of the collection table are related by a feature instance primary key value; and
    wherein the API logic selectively processes a query associated with the feature instance based, at least in part, on the spatial index.

2. The system of claim 1, comprising:
    a capture logic to capture the spatial collection content metadata;
    a decomposition logic to decompose the spatial collection content metadata into a set of decomposed data; and
    a write logic to store the set of decomposed data in a set of object relational database tables that maintain associations between feature instance spatial collection content data and feature instance data.

3. The system of claim 2, wherein to capture the spatial collection content metadata, the capture logic is to identify the collection of generic spatial collection paths associated with the feature type, to identify the collection of normalized spatial collection paths associated with the feature type, and to establish and maintain the set of mappings between the feature type and the collection of normalized spatial collection paths, and
    wherein there is an entry in the collection of normalized spatial collection paths for each entry in the collection of generic spatial collection paths.

4. The system of claim 3, wherein to decompose the spatial collection content metadata the decomposition logic is:
    to create a feature instance table to store feature instance content including a geometry object for an extracted item, and to create a set of collection tables for collection items in the collection of generic paths corresponding to the feature type and to store geometry objects associated with collection items in the set of collection tables.

5. The system of claim 4, wherein to store the set of decomposed data the write logic is to store a set of rows in the feature instance table, where a row in the feature instance table includes a primary key column to store a feature instance identifier, an Extensible Markup Language (XML) data column to store a feature instance content, and one or more geometry columns to store non-collection based spatial content.

6. The system of claim 5, wherein to store the set of decomposed data the write logic is to store a set of rows in the collection table, wherein a row in the collection table includes a primary key column to store a feature instance identifier, a collection XPath column to store data that uniquely reflects the offset of the collection item entry in a feature instance document, and a collection item column to store collection spatial item content.

7. The system of claim 6, wherein the geometry column in the feature instance table is to store an SDO_GEOMETRY object and wherein the collection item column in the collection table is to store an SDO_GEOMETRY object.

8. The system of claim 7, wherein the spatial index is an r-tree based spatial index and wherein the index logic is to populate the r-tree based spatial index with data to index collection items in the collection tables.

9. The system of claim 8, wherein the spatial index is to index feature data based on spatial collection content metadata.

10. The system of claim 9, wherein the system includes a query logic to accept an input query associated with a feature instance and to process the input query based, at least in part, on the spatial index.

11. The system of claim 10, wherein the input query is a WFS query and wherein the query logic is to produce an Structured Query Language (SQL) query from the query and to process the SQL query based, at least in part, on the spatial collection content metadata using the r-tree based spatial index.

12. The system of claim 11, wherein the query includes an XPath spatial based filter condition, and wherein the query logic is to generate an SQL query select clause, an SQL from clause, and an SQL where clause, wherein the SQL query select clause, the SQL from clause, and the SQL where clause correspond to the XPath spatial based filter condition.

13. The system of claim 12, wherein the query logic is to generate three predicates associated with the SQL query, wherein the three predicates include a referential integrity predicate, an XPath matching predicate, and a spatial operator predicate.

14. The system of claim 11, including an insert logic to insert a received feature instance into the feature instance table, wherein the insert logic is:
to identify a primary key associated with the received feature instance;
to acquire from the collection of generic spatial collection paths a collection of spatial collection paths associated with the received feature instance;
to identify a collection table storing collection items corresponding to paths in a member of the collection of spatial collection paths associated with the received feature instance;
to identify a finite enumeration of XPaths corresponding to a path associated with a collection item in the identified collection table;
to produce an SDO_GEOMETRY object for an enumeration entry in the finite enumeration; and
to insert a row into a collection table, wherein the row includes the primary key, the enumeration entry, and the SDO_GEOMETRY object.

15. The system of claim 14, including a delete logic to delete an identified feature instance, wherein the delete logic is:
to acquire a lock for a feature row in the feature instance table, the feature row being associated with the identified feature instance;
to delete the feature instance row from the feature table; and
to release the lock.

16. The system of claim 15, including an update logic to update a specified feature instance to an updated feature instance, wherein the update logic is:
to selectively control the delete logic to delete the specified feature instance; and
to selectively control the insert logic to insert the updated feature instance,
wherein only tables that store spatial collection content corresponding to XPaths in a received update command are touched by the delete logic and then touched by the insert logic.

17. A system, the system comprising:
a non-transitory computer-readable medium storing an application program interface (API) logic to provide an API associated with registering a Web Feature Service (WFS) feature type having spatial content and spatial collection based content, where the API accepts a first parameter that captures paths in a feature type definition having spatial content, and accepts a second parameter that captures a list of spatial collection related paths that contain spatial collection based content;
a registration logic to register the WFS feature type, where the WFS feature type includes a feature metadata and a spatial collection content metadata including a collection of generic spatial collection paths that describe instance specific information of the WFS feature type, a collection of normalized spatial collection paths that describe a hierarchy of spatial elements, and a set of mappings between the WFS feature type and the collection of normalized spatial collection paths; and
an index logic to produce a spatial index based, at least in part, on the spatial collection content metadata.

18. The system of claim 17, where the paths are Xpaths and the first parameter captures Xpaths in a WFS feature type XML Schema Definition (XSD) having spatial content.

19. A system, the system comprising:
a non-transitory computer-readable medium storing a registration logic to register a feature type comprising a feature metadata and a spatial collection content metadata,
where the registration logic is configured to register the feature type by capturing the spatial collection content metadata including a collection of generic spatial collection paths that describe instance specific information of the feature type and a collection of normalized spatial collection paths that describe a hierarchy of spatial elements, and is configured to generate a set of mappings between the feature type and the collection of normalized spatial collection paths; and
index logic to produce a spatial index based, at least in part, on the set of mappings between the feature type and the collection of normalized spatial collection paths, where the spatial collection content metadata determines the creation of collection storage tables and the creation of collection storage indices.

20. The system of claim 19, where one or more of inserting, deleting, querying, and updating a feature instance having spatial collection content depends, at least in part, on the spatial collection content metadata.

21. The system of claim 19, where the spatial collection content metadata is represented as a list of spatial collection related XPaths that store spatial collection data.

22. The system of claim 21, where a first mapping related to a generic collection path is created based, at least in part, on the list of spatial collection related XPaths, where a second mapping related to a normalized collection path is created based, at least in part, on the list of spatial collection related XPaths, and where the first mapping and second mapping are stored in a metadata layer.

23. The system of claim 22, where one or more of inserting, deleting, querying, and updating a feature instance having spatial collection content depend, at least in part, on one or more of, the first mapping, and the second mapping.

24. A non-transitory computer-readable medium storing computer-executable instructions that when executed by a computer cause the computer to perform a method, the method comprising:
    producing a feature instance table, collection storage indices, and a set of collection item tables based, at least in part, on spatial collection content metadata to register a Web Feature Service (WFS) feature type;
    where the WFS feature type includes a collection of generic spatial collection paths that describe instance specific information of the WFS feature type, and a collection of normalized spatial collection paths that describe a hierarchy of spatial elements;
    producing a spatial index based, at least in part, on a set of mappings between the WFS feature type and the collection of normalized spatial collection paths; and
    selectively processing a query associated with a feature instance based, at least in part, on the spatial index.

25. A system, comprising:
a non-transitory computer-readable medium;
means for registering a feature type embodied, at least in part, on the non-transitory computer-readable medium,
wherein registering the feature type includes producing a feature instance table, collection storage indices, and a set of collection item tables based, at least in part, on spatial collection content metadata including a collection of generic spatial collection paths that describe instance specific information of the feature type, and a collection of normalized spatial collection paths that describe a hierarchy of spatial elements;
wherein registering the feature type includes producing a spatial index from at least a set of mappings between the feature type and the collection of normalized spatial collection paths; and
means for processing a associated with a feature instance based, at least in part, on the spatial index.

* * * * *

UNITED STATES PATENT AND TRADEMARK OFFICE
CERTIFICATE OF CORRECTION

| | | |
|---|---|---|
| PATENT NO. | : 8,145,641 B2 | Page 1 of 1 |
| APPLICATION NO. | : 12/009456 | |
| DATED | : March 27, 2012 | |
| INVENTOR(S) | : Chatterjee et al. | |

It is certified that error appears in the above-identified patent and that said Letters Patent is hereby corrected as shown below:

In the Specifications:

In column 6, line 55, delete "$collection_n$," and insert -- $collection_N$ --, therefor.

In column 9, line 44, delete "collection-item" and insert -- collection item --, therefor.

In column 10, line 38-39, delete "// index the spatial" and insert -- index the // spatial --, therefor.

In column 12, line 34, before "set" delete "the".

In column 13, line 25, delete "base" and insert -- based --, therefor.

In column 16, line 46, delete "// entry in LC which" and insert -- entry in LC // which --, therefor.

In column 16, line 48, delete "// normalized" and insert -- normalized // --, therefor.

In column 16, line 49, delete "// patterns of LC derived" and insert
-- patterns of LC // derived --, therefor.

In the Claims:

In column 24, line 27, in Claim 25, delete "a" and insert -- a query --, therefor.

Signed and Sealed this
Seventeenth Day of July, 2012

David J. Kappos
*Director of the United States Patent and Trademark Office*